July 11, 1972     M. J. RAFUSE     3,675,987

LIQUID CRYSTAL COMPOSITIONS AND DEVICES

Filed March 29, 1971     3 Sheets-Sheet 1

PER CENT OF p-ETHOXYBENZYLIDENE p-n-BUTYLANILINE IN MIXTURE WITH p-METHOXYFORMYLOXY-BENZYLIDENE p-n-BUTYLANILINE

INVENTOR
MARY JANE RAFUSE
BY
ATTORNEY

3,675,987
LIQUID CRYSTAL COMPOSITIONS AND DEVICES
Mary J. Rafuse, Harvard, Mass., assignor to Sperry Rand Corporation
Filed Mar. 29, 1971, Ser. No. 128,666
Int. Cl. G02f 1/16
U.S. Cl. 350—160                                                   18 Claims

ABSTRACT OF THE DISCLOSURE

Room temperature nematic liquid crystal compositions suitable for use as scatterers of light in optical devices are presented as a basic new component p-methoxyformyloxybenzylidene p-n-butylaniline. Such compositions may also include p-ethoxybenzylidene p-n-butylaniline or p-butoxybenzylidene p-n-butylaniline, along with certain additives including p-toluylidene p-n-butylaniline. The compositions are employed in the form of thin layers within thin cells having transparent electrodes with means for applying electric fields across the layer. The display is formed by electrically controlling light-scattering properties of the liquid crystal layer.

BACKGROUND OF THE INVENTION

(1) Field of the invention

The invention pertains to improved nematic liquid crystal compositions and display apparatus including these novel compositions and more especially relates to improved nematic materials and compositions of materials useful in optical instruments and operating in the wide temperature range from as low as −12° centigrade to above +45° centigrade.

(2) Description of the prior art

Certain classes of nematic liquid crystal materials have been found to exhibit dynamic scattering electro-optical effects. For example, one material, known to the industry as p-anisylidene p-aminophenyl acetate, exhibits such optical properties at temperatures lying between 83° and 110° centigrade. Compositions found to be of interest in the past also include mixtures of p-anisylidene p-aminophenyl acetate with butyl p-(p-ethoxyphenoxycarboynl) phenyl carbonate (nematic 29 to 78° centigrade), and mixtures of p-alkoxybenzylidene p-aminophenyl acylate. Schiff bases have been of interest that can operate somewhere in the temperature of +22 to +105° centigrade. Higher temperature prior art mixtures of materials include p-azoxyanisole, p-azoxyphenetol, and the cyano-substituted benzylidene anilines such as p-n-octoxybenzylidene p-aminobenzonitrile and its mixtures with other cyano Schiff bases. Generally known prior art materials operate at temperatures well above 20° centigrade.

These and other nematic compositions are characterized by two transition temperatures. The first is at the transition point between the crystalline solid state and the mesomorphic or liquid crystal state. The second transition temperature is at the transition between the liquid crystal state and the isotropic fluid state.

It is usually desired to operate optical instruments, including display devices, at convenient temperatures such as at or near ambient room temperature or even lower temperatures. Prior art nematic compositions which have solid-to-liquid crystal transitions above room temperature must be heated to keep them in the mesomorphic state. Such temperature control is expensive and power consuming. Furthermore, relatively precise and expensive temperature regulation is required with prior art compositions which generally remain in the liquid crystal state only over relatively narrow temperature ranges. Instruments such as optical displays using nematic materials require continuous heating if they are to be ready for instant use, or time must otherwise be consumed in bringing the composition to its proper operating temperature.

Nematic liquid crystal materials offer utility, for example, in electrically controlled display devices of the flat panel type. For instance, one prior art application of electrically controllable dynamic scattering materials employs a structure which is a cell of sandwich configuration comprising a transparent planar front electrode and a specularly reflective back electrode closely spaced with respect thereto. Between the two electrodes is located a thin layer of active nematic material. With no electric field applied between the two electrodes, the liquid crystal material is optically transparent. Thus, if the back electrode is black, the cell looks black to a viewer looking into it through its transparent front. However, when a unidirectional or alternating electric field is applied between the electrodes, the liquid abruptly loses its transparent characteristic, scattering any light flowing into it through its transparent front electrode. In this state, the scattered light is returned to the viewer, and the apparent color of the cell is generally of the same spectral content as the light passing into it through the front electrode; i.e., nearly white in the usual circumstance. When the electric field is removed, the material abruptly reverts to its transparent state and looks black to the observer.

The scattering effect in the presence of an electric field has been explained as being caused by localized variations in the effective index of refraction of the medium produced when groups of neutral molecules within the medium are set into motion by the electric field. Apparently, ions set in motion through the normally aligned nematic medium supply the initial shearing disruptive effects. Therefore, some speak of the scattering effect as one produced by the presence of turbulence within the optical medium.

Prior art displays have made advantageous use of the several properties of prior liquid crystal compositions. These displays have been digital or discrete in nature; a multiplicity of discrete fixed area electrode segments has been employed, often in regular arrays. Such displays embody planar panels with a plurality of discrete electrodes, segments formed on the display electrode surface, isolated spatially and electrically from one another. Energization of the display is such that discrete areas of nematic material are either excited or are not excited; i.e., are fully bright in appearance or are dark.

Analog displays are also conveniently generated by the apparatus described by R. A. Soref in the U.S. patent application Ser. No. 879,645, for "Liquid Crystal Display Device," filed Nov. 25, 1969 and assigned to the Sperry Rand Corporation. Soref provides means for producing a continuously scannable, continuously movable, and continuously alterable bright display image by means of crystalline liquid media controlled to be transparent or optically scattering by simple control circuits operating at relatively low voltage levels. There is provided an electrically controllable flat screen display by placing a nematic medium between electrode plates, at least one of which is transparent, the electrode plates forming part of a cell enclosing the nematic medium. The transparent electrode is provided with two or more usually different electrical potentials at suitable terminals so that electrical field gradients are generated across the nematic medium. A plurality of image configurations may thus be generated by the influence of the electric fields upon the nematic medium, the images consisting of transparent and translucent areas. A variety of continuously variable images may be generated, including large or small area, time-alterable, transparent analog patterns in a translucent background, or vice versa.

SUMMARY OF THE INVENTION

The invention comprises a family of room temperature active liquid crystal compositions of matter and novel electro-optical apparatus employing the compositions for the electrically controlled scattering or transmission of light for display and other electro-optical purposes. The novel liquid crystal compositions are useful for such purposes in wide portions of the range of temperatures between —12° centigrade and +60° centigrade. The compositions employ as a primary material p-methoxyformyloxy-benzylidene p-n-butylaniline. This primary material is mixed in particular proportions with p-ethoxybenzylidene p-n-butylaniline or p-butoxybenzylidene p-n-butylaniline. Additives may include lesser proportions of materials of the types including p-toluylidene p-n-butylaniline, p-n-butoxybenzoic acid, p-n-butoxyphenol, p-methoxyacetophenone, or p-n-butoxybenzaldehyde. The novel electro-optically active liquid crystal materials are employed in thin layers in optical cells having transparent electrodes with means for applying electric fields across the layer. The desired display is formed by selection of appropriate patterns of electrical fields to be imposed across the active layer, the electric fields serving to alter the light scattering proporties of the liquid crystal layer.

DESCRIPTION OF THE PREFERRED EMBODIMENTS

Figure 1:
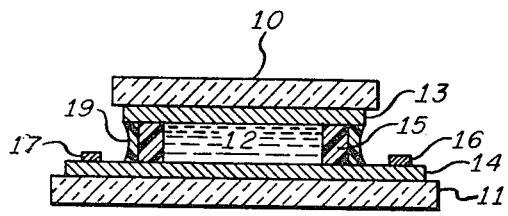
FIG. 1 is a view in cross section of one form of the invention.
Figure 2:
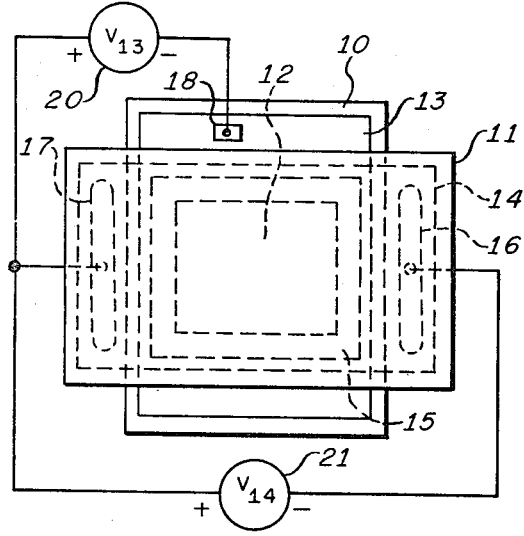
FIG. 2 is a front view of the apparatus of FIG. 1.

The novel electro-optically active nematic liquid crystal compositions described herein may be employed in the electrically controllable, flat panel display device of FIGS. 1 and 2 for the purpose of generating displays in which the size, shape, and location of the two-dimensional display pattern may be changed continuously, as well as in discrete steps. By means of the apparatus of FIGS. 1 and 2, there may be produced a continuously scannable, continuously movable, and a continuously alterable, bright display image by means of crystalline liquid media exhibiting dynamic scattering phenomena, which media may be controlled to be transparent or optically scattering by simple control circuits operating in the novel display at relatively low voltage and power levels.

In FIGS. 1 and 2, a typical construction for the invention is shown utilizing a pair of parallel-sided flat glass plates 10 and 11 preferably arranged parallel to each other and separated by a thin layer 12 of the novel electric field sensitive nematic liquid crystal materials according to the present invention. Plate 10 and plate 11 are coated on their inner surfaces with thin conducting electrode means 13 and 14, respectively. A cell for containing the nematic material is further defined by a continuous quadrilateral dielectric wall 15. Extended lineal or elongate voltage terminals 16 and 17 are applied in conductive relation to electrode 14 on glass plate 11 at the respective opposite ends of that electrode. By virtue of their relatively low resistances, terminals 16 and 17 act as equipotential surfaces. A relatively small electrical terminal 18 may be used in conductive relation with electrode 13 on glass plate 10.

Glass plates 10 and 11 may be made of any suitable glass or other transparent insulating materials compatible with the optical and other requirements of the cell system. For example, the material may be selected to have an optical index of refraction similar to that of the electric field sensitive nematic material 12 so as to avoid undesired reflections at optical interfaces.

The optically transparent conducting electrodes 13 and 14 may be made of tin oxide, aluminum oxide, or other similar materials bonded to glass plates 10 and 11 by chemical or evaporative deposition, by sputtering, or by other suitable known methods. The choice of materials is such that conducting electrode 13 has a low resistivity of the order of 100 ohms per square, for example, so that the whole of electrode 13 may readily reach the same potential level as applied to terminal 18. On the other hand, the material of electrode 14 has a relatively high resistivity of about 500,000 ohms per square, for example. Other resistivity values may be employed, but a relatively high resistivity is beneficial because ohmic loss within electrode 14 is then minimized, thereby preventing appreciable temperature rise in the liquid crystal layer 12. Also, the current drawn from external power sources is desirably minimized. The resistivity characteristic of the material of electrode 14, which is deposited on glass plate 11 (the plate that is normally considered to be the viewing plate of the cell) is of major importance to the operation of the invention, as will be described hereinafter.

So that the liquid crystal layer 12 may be contained in its pure form, protected from contaminants, and be of uniform thickness, dielectric wall 15 is formed as a continuous wall; it is readily constructed of a tape available in the market made of a polymerized fluorocarbon resin material sold under the trade name "Teflon." The tape is available in thicknesses of the order of 1.0 mil, a thickness suitable for use in the present invention. The cell may be held together, at least in part, by a miniscus-shaped film 19 of epoxy material or other suitable sealing material applied to the external free surface of wall 15 so that it bonds to that surface and to the adjacent exterior surfaces of electrodes 13 and 14.

The elongated terminals 16 and 17 on plate 11 and the small terminal 18 on plate 10 may be constructed in the conventional manner from a silver, electrically-conducting epoxy material available on the market or by deposition of an area of low conductivity tin oxide by one of the aforementioned processes. A voltage source 20 for supplying a voltage $V_{13}$ is connected between terminals 18 and 17, while a second voltage source 21 is connected between the terminals 16 and 17 common to electrode 14 for supplying a voltage $V_{14}$ thereacross.

It should be understood in considering the structure of the apparatus of FIG. 1 that the state of the liquid crystal layer 12 may, for instance, be viewed by the observer from above glass plate 11 through transparent electrode 14. It should also be understood that the drawing of FIG. 2 has been made for convenience as if one viewing the drawing is similarly looking through plate 11 and electrode 14. Below the plane of electrode means 14, the viewer sees the dielectric tape wall 15 and the liquid crystal layer 12. Below the plane in which the latter two items lie, the observer may see the second electrode means 13 and the second glass plate 10.

In operation, the apparatus of FIGS. 1 and 2 makes significant use of the spatial voltage gradient or variation set up across the transparent high resistance electrode means 14. While electrode means 13 may instead be used as the high resistance electrode, or both electrodes may be of high resistance material, only the electrode 14 will be considered to be a high resistivity electrode at this time for the sake of simplifying the discusion. With a potential gradient set up across electrode 14, the potential difference between electrodes 13 and 14 (which is the potential drop seen across the liquid crystal layer 12) varies from one spatial location across layer 12 to a next location. This potential variation gives rise to controllable regions of transparency and translucence within layer 12, providing that the values of $V_{13}$ and $V_{14}$ have been appropriately selected. The dimension of the transition region between transparent and translucent regions is relatively sharp when employing the novel liquid crystal materials of the present invention.

Figure 3:
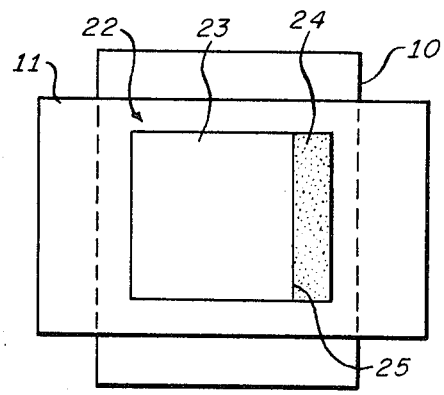
FIG. 3 is a view of a display produced by the apparatus of FIGS. 1 and 2.

Referring to FIG. 3, there is seen a typical display 22 produced according to the present invention within the novel liquid crystal material. The display comprises a rectangular bright area 23 and a rectangular dark area 24 with a common transition boundary 25. Boundary 25 is readily moved to the left or to the right by relative variation of voltages $V_{13}$ and $V_{14}$.

In FIGS. 1 to 3, the rectangular bright area or bar 22 is changed in width by changing the relative magnitudes of voltages $V_{13}$ and $V_{14}$ according to a desired pattern. The value of voltage $V_{13}$ may be held fixed, while the value of voltage $V_{14}$ may be changed, or vice versa. For example, consider the result when voltage $V_{13}$ is set to zero and voltage $V_{14}$ is increased from zero. This action causes the bright bar or area 23 to increase in width from zero as boundary 25 moves to the right in the drawing, the size of the dark region 24 changing correspondingly. Other arrangements for producing a variety of similar analog displays are disclosed in the above-mentioned Soref patent application S.N. 879,645, such as arrangements which create two of the bright movable areas such as area 23 of FIG. 3 and which can cause the bright areas to move in cooperative relation so as to expose a movable constant width window or dark area or bar between the two bright areas. Such arrangements may be used to provide or simulate indicator elements or pointers by providing variable length bars or movable windows to tell a viewer the magnitude of any parameter which may be converted into a voltage and used as one of the voltages $V_{13}$ or $V_{14}$. Vertical or horizontal formats are equally possible for the display of temperature, pressure, velocity, acceleration, or other parameters. A suitable scale may be provided next to the bar presentation, for instance, and values of the parameter involved may be read directly off the scale. The scale may itself be generated by constant excitation or nematic cells shaped or masked to form numerals. The novel liquid crystal compositions may also be used in other display devices, including seven-digit numeric displays and matrix displays.

The multiple component electro-optically active nematic liquid crystal compositions described herein include as a common principal component a novel active electro-optic medium consisting of p-methoxyformyloxybenzylidene p-n-butylaniline, which it is believed may be illustrated graphically by the formula:

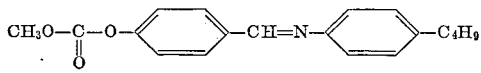

This principal component forms useful room temperature-operable nematic liquid crystal compositions when mixed with certain p-alkoxybenzylidene p-n-butylanilines. Ionizable additives may also be added to such mixtures for purposes which will become apparent.

The above principal or primary component is prepared by refluxing the appropriate aldehyde and amine in dry alcohol. Commercially available benzaldehydes and p-n-butylaniline are used after purification. Specifically, p-methoxyformyloxybenzylidene p-n-butylaniline is prepared by first preparing methyl p-formylphenyl carbonate. To a solution of commercially available p-hydroxybenzaldehyde (2.4 g.; 0.02 mole) in 15 ml. of dry ether containing 4 ml. of pyridine is added methyl chloroformate (2.5 ml.), while cooling and stirring the solution. The reaction mixture is stirred substantially at room temperature for two hours and is then filtered. The solvent is removed by evaporation under reduced pressure. The residue is then induced to crystallize by chilling it. The crystals are next redissolved in hexane and again recrystallized. A typical yield using the above proportions is 2.50 g. (a 70 percent yield) of white methyl p-formylphenyl carbonate crystals having a melting point lying between 34 and 36° centigrade. The infrared spectrum of this material in $CCl_4$ included wave numbers 2820, 2730, and 1710 cm.$^{-1}$ stemming from the aldehyde portion of the generated molecule and 1760 cm.$^{-1}$ from the carbonate portion. The spectrum confirms the chemical constitution of the resultant material.

Methyl p-formylphenyl carbonate crystals (1.8 g.; 0.01 mol) are then refluxed with p-n-butylaniline (1.5 g.; 0.01 mol) in 10 ml. of dry ethanol for two hours with stirring. The cool reaction mixture is filtered and the precipitate is recrystalized from hexane. With the above proportions, there is a yield of 2.48 g. (an 80 percent yield) of pale yellow crystals of the desired p-methoxyformyloxybenzylidene p-n-butylaniline. The observed infrared spectrum in $CCl_4$ confirms the chemical constitution of the product, indicating the loss of nitrogen-hydrogen bonds in the new material and the absence of the aldehyde portions.

Tests of the new material yield an operational temperature range between 55 and 61° centigrade displaying nematic characteristics. When cooled, the material forms a monotropic nematic liquid crystal state which converts to a crystalline solid state at 32° centigrade. In the optical scattering condition, the material has a white appearance under white light. It is believed that the benzylidene portion of the molecule is active in conferring liquid crystal characteristics upon the new material, the general geometry of the molecule being such as otherwise to permit the liquid crystal phase to exist. It is believed that the presence of the methylformyloxy portion of the molecule contributes to the high opacity of this primary material when in its optically scattering state and to its high resistivity and consequent longer lifetime of the state.

The relatively high electro-optically active temperature range of the principal material p-methoxyformyloxybenzylidene p-n-butylaniline is reduced, according to the invention, by the addition of a known alkoxy benzylidene p-n-butylaniline, such as identified by the graphic formula:

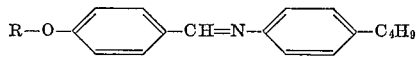

The added or secondary material may be a p-ethoxy material where R is $C_2H_5$, or a p-n-butoxy material, where R is $C_4H_9$. The phase "secondary material" is used herein to indicate a second material whose presence plays a role substantially equally as significant as that of the primary material in yielding the desired results exhibited by a binary or ternary composition.

The p-ethoxybenzylidene p-n-butylaniline material is previously known to those skilled in the art as a relatively weak dynamic scattering nematic liquid crystal operable between 35 and 75° centigrade. In the example, equal weights of the primary p-methoxyformyloxybenzylidene p-n-butylaniline material and of the temperature lowering secondary p-ethoxybenzylidene p-n-butylaniline crystals are weighed out and mixed thoroughly while warming until mutually dissolved and all of the mixture is in its liquid isotropic state. The material is cooled into the nematic liquid crystal state with continued agitation to ensure continued adequate mixing. The dual component composition is utilized by placing it in a cell between closely spaced glass surfaces with a transparent electrode on at least one glass surface, as in the prior art. Application of an electric field across the thin film is accomplished for controlling the transparent and opaque states of the film, as in the prior art. The equal component mixture is found to demonstrate the desired liquid crystal display effects over the wide temperature range of $-12°$ to $+60°$ centigrade. This range is particularly advantageous, extending considerably above and below ambient room temperature, and making the composition useful in many environments for which prior art liquid crystal materials are entirely unsuited. This beneficial result is achieved while still maintaining a contrast ratio (between the transparent and turbulent states) of substantially five to one.

Figure 4:
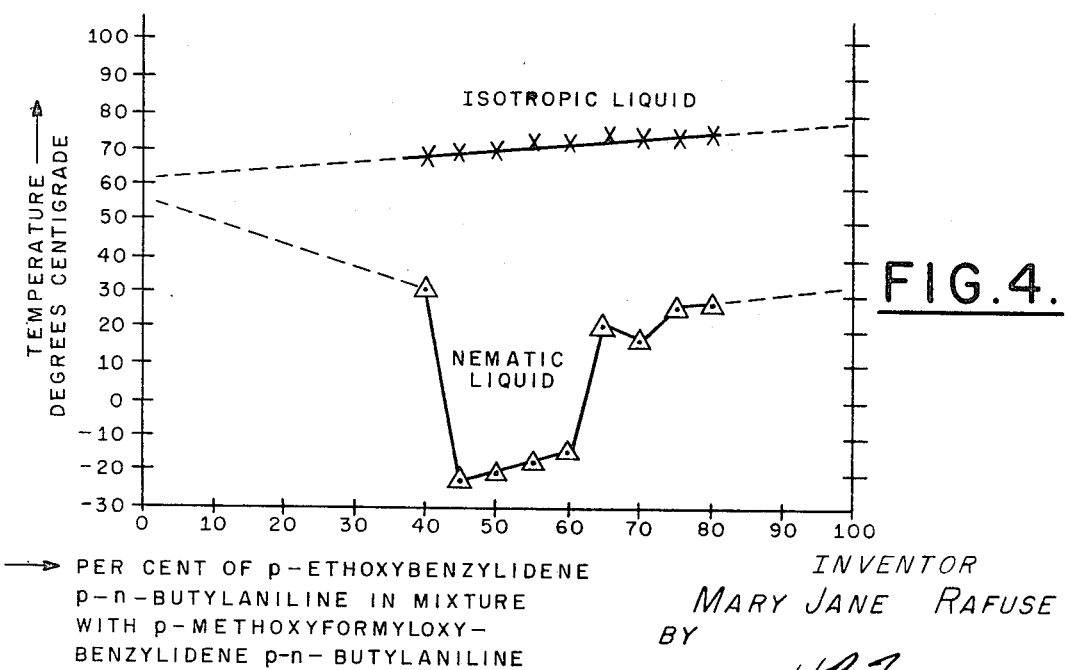
FIGS. 4, 5, and 6 are graphs describing useful properties of forms of the novel compositions.

Other than equal proportions by weight of the primary and alkoxybenzylidene p-n-butylaniline materials may be employed. For example, FIG. 4 illustrates the behavior of the dual component mixture employing the primary material p-methoxyformyloxybenzylidene p-n-butylaniline and the secondary p-ethoxybenzylidene p-n-butylaniline in various ratios. It is observed that percentages of the secondary to primary materials in the measured range of substantially 42.5 to 63.3 percent permit operation at 10° centigrade, of substantially 43.5 to 62.5 percent permit operation at 0° centigrade, and of substantially 45 to 60.5 percent permit operation at —10° centigrade. It is seen that the range of possible choice of percentages remains wide, though decreasing somewhat, for example, from 20° centigrade to —10° centigrade. In other words, changes in relative proportions of the dual mixture have little influence on the desired operation of the novel composition over the temperature range of +20° to —10° centigrade. A mixture using about 45 percent of the secondary material operates at a temperature even as low as substantially —20° centigrade. It is therefore a material of especially important advantages for use in special relatively low temperature applications. The appearance of the material in the cell switches from transparent to milky with none of the yellow cast observed in prior art materials.

As noted previously, p-butoxybenzylidene p-n-butylaniline may be mixed with the primary material p-methoxyformyloxybenzylidene p-n-butylaniline to form a second novel electro-optically active material of desirable low temperature nature. The mixture is formed in the general manner employed in forming the previously discussed mixture employing the secondary material p-ethoxybenzylidene p-n-butylaniline. From FIG. 5, it is observed that percentages of the secondary material p-butoxybenzylidene p-n-butylaniline to the primary material p-methoxyformyloxybenzylidene p-n-butylaniline in the measured range of substantially 30 to 70 percent by weight permit operation at substantially 35° centigrade, and of substantially 55 to 65 percent by weight permit operation at substantially 25° centigrade. A mixture using about 60 percent of the secondary material is found to operate at 15° centigrade. This second binary composition is therefore an advantageous electro-optically active material for use in relatively low temperature applications.

It has furthermore been found that the operating temperature range of the binary material containing p-butoxybenzylidene p-n-butylaniline may be desirably reduced by the addition of a relatively small quantity of a temperature depressant such as the novel material p-toluylidene p-n-butylaniline so that a ternary composition is generated. The latter temperature depressant may be descriped graphically by the formula:

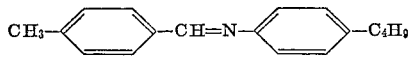

This novel material may be used in other binary or ternary compositions and has the general geometric symmetry of the kind which often provides a molecule having liquid crystal characteristics. However, it has no dipole characteristics at right angles to the long axis of the molecule. Therefore, the intermolecular interactions are too weak to confer liquid crystal properties. Because of its long, thin shape, the p-toluylidene p-n-butylaniline molecule will fit compatibly between other molecules actually having good liquid crystal properties, weakening such intermolecular attraction and consequently lowering the operating temperature range of the multi-component composition.

The novel compound p-toluylidene p-n-butylaniline may be generated by the following method. Commercially available p-tolualdehyde (24.03 g.: 0.2 mole) and commercial p-n-butylaniline (29.85 g.: 0.2 mole) are refluxed for two hours in 25 ml. of absolute ethanol. The reaction mixture, diluted with benzene, is washed with water, then with 10 percent sodium hydroxide, then again with water to neutrality before the dried solution is evaporated to remove the solvent. The residue is distilled twice under reduced pressure to yield 34.59 g. of a constant boiling fraction (B.P. 139–141° centigrade at 0.06 mm. of mercury) of p-toluylidene p-n-butylaniline (a 69 percent yield). The refractive index of the pale yellow liquid is 1.6085 at 24° centigrade.

One preferred example of a novel ternary liquid crystal composition according to the invention employs 45 percent by weight of the primary p-methoxyformyloxybenzylidene p-n-butylaniline material, 45 percent by weight of the secondary p-butoxybenzylidene p-n-butylaniline material, and 10 percent of the p-toluylidene p-n-butylaniline material. This ternary composition displays excellent nematic liquid crystal properties over a range of temperatures from less than 0° to +47° centigrade. Equal parts of these primary and secondary materials, without the additive, demonstrate an operating temperature range of 35° to 75° centigrade. The ternary material is clear when unactivated in an optical cell and in the turbulent state has a white milky appearance in white light, again lacking the yellowish appearance general in prior art nematic compositions. The general range of operating temperatures may be altered arbitrarily by the use of a greater or lesser portion of the p-toluylidene p-n-butylaniline material. Also, other than equal proportions of the primary p-methoxyformyloxybenzylidene p-n-butylaniline and of the secondary p-butoxybenzylidene p-n-butylaniline material may be employed.

Figure 5:
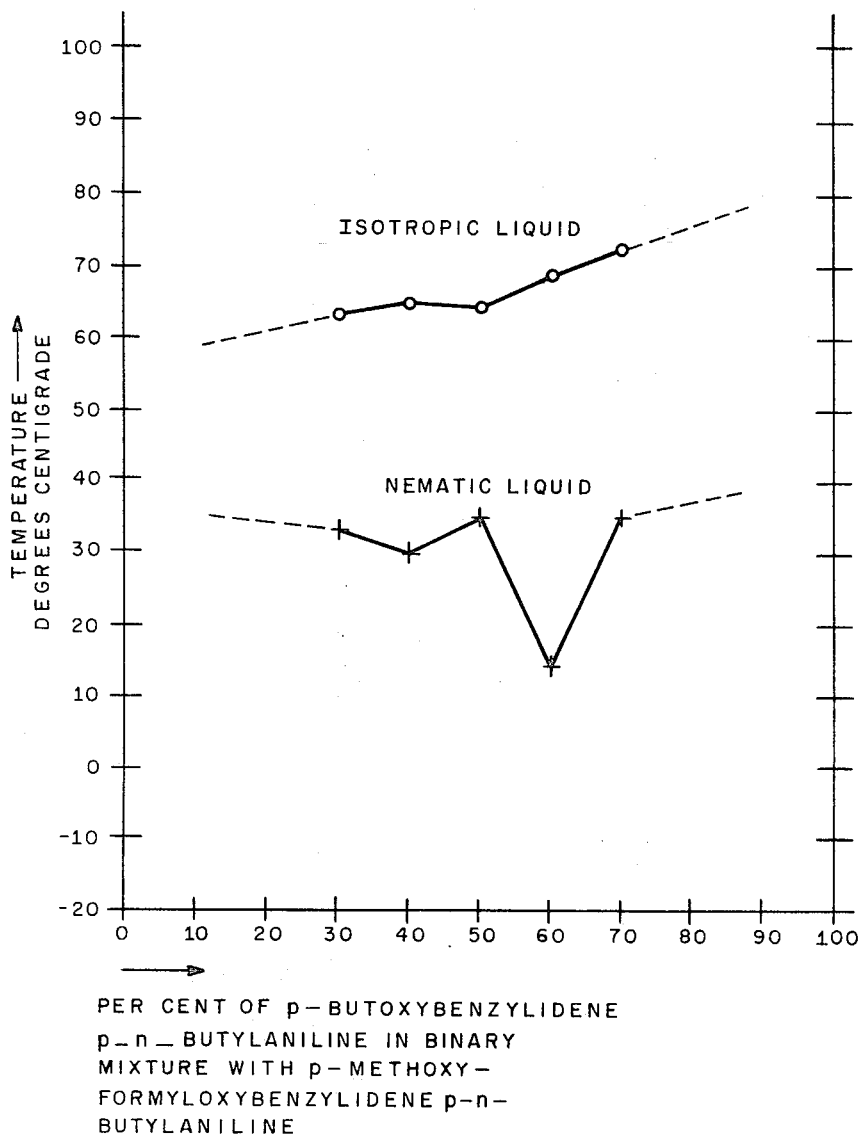
Figure 6:
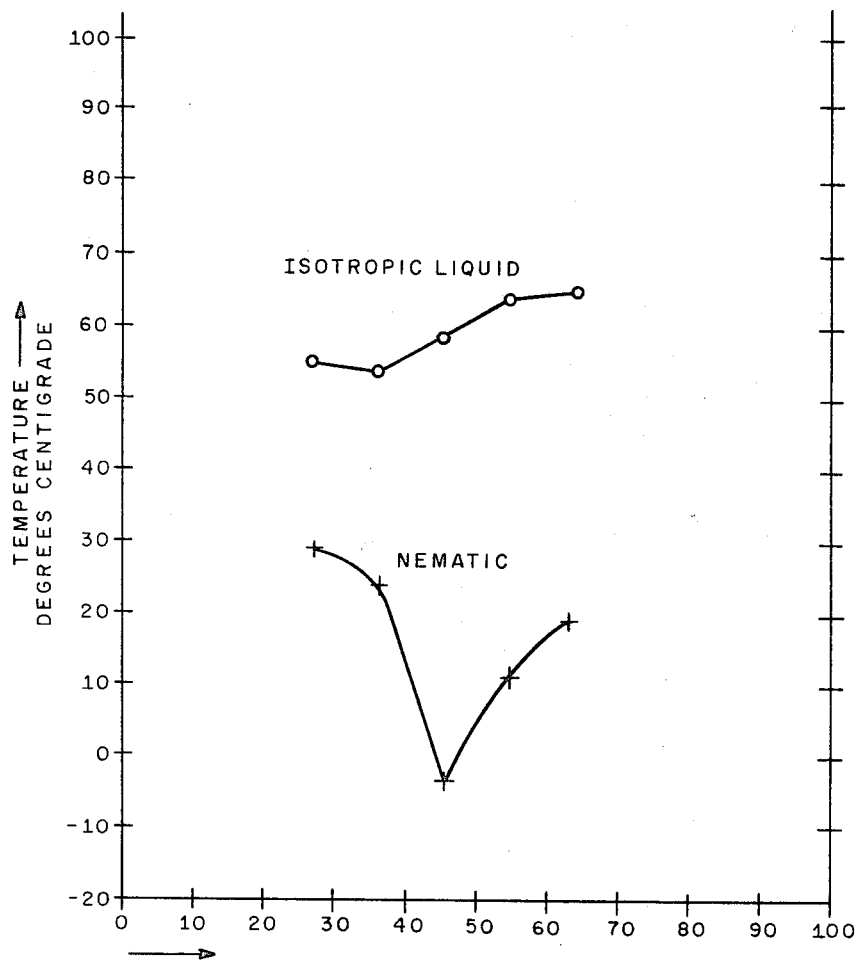

For example, FIG. 6 illustrates the behavior of such a ternary material when the proportions of the primary and secondary materials are altered while using p-toluylidene p-n-butylaniline as an additive. As seen in FIGS. 5 and 6, the additive significantly lowers the operating temperature range of the original binary composition. It is observed that percentages of the secondary butoxy material to the primary material in the measured range of substantially 37.5 to 62.5 percent by weight permit operation at substantially 20° centigrade, and of substantially 41 to 59 percent by weight permit operation at substantially 10° centigrade. Operation at substantially 5° centigrade is possible over the percentage range from substantially 42.5 to 50 by weight. It is also observed that this ternary material operates at about —4° centigrade for a 45 percent p-butoxybenzylidene p-n-butylaniline mixture, and that it is therefore adapted to operate at much lower temperatures than the binary p-butoxy material lacking the p-toluylidene p-n-butylaniline additive.

Relatively small additive proportions of easily ionizable materials may be added to any of the foregoing, including ionizable materials such as p-n-butoxybenzoic acid, p-n-butoxyphenol, p - methoxyacetophenone, and p-n-butoxybenzaldehyde. The effect of the ionizable additive is to act as ready carriers for electrons injected by the cell electrode, without excessive breakdown of the material, consequently enhancing opacity by increasing turbulence. For example, a compound comprising 48.6 percent by weight of the primary methoxyformyloxybenzylidene p-n-butylaniline and 48.6 percent of p-ethoxybenzylidene p-n-butylaniline with 4.8 percent p-n-butoxybenzoic acid demonstrates generally similar properties to those of the equal portion binary material first described above, but demonstrating liquid crystal characteristics over the modified temperature range including —12° and +55° centigrade, as opposed to —12° and +60° centigrade. Contrast ratios of six to one are demonstrated in such a ternary material. Substitution of p-n-butoxyphenol for p-n-butoxybenzoic acid yields measured contrast ratios as high as nine to one.

According to the invention, there is provided a family of room temperature active liquid crystal compositions of matter particularly suitable for use as nematic liquid crystal compositions in the novel optical display or in optical switches or other optical instruments. Binary and ternary compositions are disclosed useful in such instruments at temperatures between —12° and +60° centigrade, whereas few prior art liquid crystal compositions display useful properties below 20° centigrade.

While the invention has been described in its preferred embodiments, it is to be understood that the words which have been used are words of description rather than limitation and that changes within the purview of the appended claims may be made without departure from the true scope and spirit of the invention in its broader aspects.

I claim:
1. An electro-optically active device comprising:
   container means for supporting a layer of electro-optically active material, and
   transparent electrode means constituting a portion of said container means for applying an electric field across said active layer,
   said layer consisting of p-methoxyformyloxybenzylidene p-n-butylaniline.
2. The combination described in claim 1, wherein said layer consists of:
   an alkoxybenzylidene p-n-butylaniline, and
   said p-methoxyformyloxybenzylidene p-n-butylaniline.
3. The combination described in claim 2 wherein said layer includes as an additive p-toluylidene p-n-butylaniline.
4. The electro-optically active liquid crystal material p-methoxyformyloxybenzylidene p - n - butylaniline as represented by the formula:

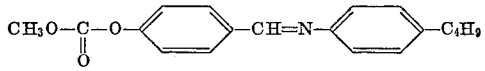

5. The electro-optically active liquid crystal material consisting of:
   an alkoxybenzylidene p - n - butylaniline represented by the formula:

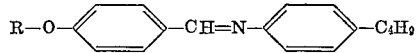

where R is an alkoxy radical, and p-methoxyformyloxybenzylidene p-n-butylaniline.
6. The composition described in claim 5 wherein the alkoxy radical is p-ethoxy.
7. The composition described in claim 6 containing substantially 40 to 80 parts in a hundred parts by weight of the compound p-ethoxybenzylidene p-n-butylaniline and substantially 60 to 20 parts by weight of the compound p-methoxyformyloxybenzylidene p-n-butylaniline.
8. The composition described in claim 6 containing substantially 42.5 to 63 parts in one hundred parts by weight of the compound p-ethoxybenzylidene p-n-butylaniline and substantially 57.5 to 37 parts by weight of the compound p - methoxyformyloxybenzylidene p-n-butylaniline.
9. The composition described in claim 6 containing substantially 43.5 to 62.5 parts in one hundred parts by weight of the compound p - ethoxybenzylidene p-n-butylaniline and substantially 56.5 to 37.5 parts by weight of the compound p - methoxyformyloxybenzylidene p-n-butylaniline.
10. The composition described in claim 6 containing substantially 45 parts in one hundred parts by weight of the compound p - ethoxybenzylidene p-n-butylaniline and 55 parts by weight of the compound p-methoxyformyloxybenzylidene p-n-butylaniline.
11. The composition described in claim 5 wherein the alkoxy radical is p-butoxy.
12. The composition described in claim 11 consisting of substantially 30 to 70 parts in a hundred parts by weight of the compound p-butoxybenzylidene p-n-butylaniline and substantially 80 to 30 parts by weight of the compound p-methoxyformyloxybenzylidene p - n - butylaniline.
13. The composition described in claim 11 consisting of substantially 55 to 65 parts in a hundred parts by weight of the compound p-butoxybenzylidene p-n-butylaniline and substantially 45 to 35 parts by weight of the compound p - methoxyformyloxybenzylidene p-n-butylaniline.
14. The composition described in claim 11 containing substantially 60 parts in one hundred by weight of the compound p - butoxybenzylidene p - n - butylaniline and 40 parts by weight of the compound p-methoxyformyloxybenzylidene p-n-butylaniline.
15. The composition described in claim 11 containing substantially 37.5 to 62.5 parts by weight in one hundred of the compound p-butoxybenzylidene p-n-butylaniline, substantially 52.5 to 27.5 parts by weight in one hundred of the compound p - methoxyformyloxybenzylidene p-n-butylaniline, and substantially 10 parts by weight in one hundred of p-toluylidene p-n-butylaniline.
16. The composition described in claim 11 containing substantially 41 to 59 parts by weight in one hundred of the compound p - butoxybenzylidene p-n-butylaniline, substantially 49 to 31 parts by weight in one hundred of the compound p - methoxyformyloxybenzylidene p-n-butylaniline, and the compound p-toluylidene p-n-butylaniline.
17. The composition described in claim 11 containing substantially 45 parts by weight in one hundred parts of the compound p - butoxybenzylidene p - n - butylaniline, substantially 45 parts by weight in one hundred of the compound p - methoxyformyloxybenzylidene p-n-butylaniline, and the compound p-toluylidene p-n-butylaniline.
18. The composition described in claim 5 having as an additive p-toluylidene p-n-butylaniline.

References Cited
UNITED STATES PATENTS

| | | | |
|---|---|---|---|
| 3,499,702 | 3/1970 | Goldmacher et al. | 350—160 X |
| 3,575,493 | 4/1971 | Heilmeier | 350—160 |
| 3,597,044 | 8/1971 | Castellano | 350—160 |
| 3,622,226 | 11/1971 | Matthies | 350—160 |

RONALD L. WIBERT, Primary Examiner

E. S. BAUER, Assistant Examiner

U.S. Cl. X.R.

252—408; 260—463, 566